United States Patent
Noguchi et al.

Patent Number: 5,649,878
Date of Patent: Jul. 22, 1997

[54] CHAIN TENSIONER

[75] Inventors: Yuji Noguchi, Toyota; Yasutoshi Imai, Ichinomiya, both of Japan

[73] Assignee: Aisin Seiki Kabushiki Kaisha, Aichi-pref., Japan

[21] Appl. No.: 580,154

[22] Filed: Dec. 28, 1995

[30] Foreign Application Priority Data

Dec. 28, 1994 [JP] Japan .................................. 6-339197

[51] Int. Cl.⁶ ........................................................ F16H 7/08
[52] U.S. Cl. .................................... 474/110; 474/135
[58] Field of Search ............................. 474/101, 110, 474/111, 133, 135, 140

[56] References Cited

U.S. PATENT DOCUMENTS

| | | | |
|---|---|---|---|
| 4,355,991 | 10/1982 | Kraft | 474/110 |
| 4,371,360 | 2/1983 | Ojima et al. | 474/111 |
| 5,116,284 | 5/1992 | Cho | 474/135 X |
| 5,277,664 | 1/1994 | Mott | 474/110 |
| 5,558,587 | 9/1996 | Church | 474/112 |

FOREIGN PATENT DOCUMENTS 58-38189  8/1983  Japan.

*Primary Examiner*—Roger J. Schoeppel
*Attorney, Agent, or Firm*—Hazel & Thomas

[57] ABSTRACT

A chain tensioner free from excess tension caused by push-back of chain upon mounting. The chain tensioner has a support for mounting a casing at a pre-set position, a thrusting member slidably arranged within the casing for applying tension to a chain, a biasing unit for supplying a thrusting force to the thrusting member for supplying a pre-set tension to the chain when commanded, a retention unit for retaining the biasing force of the thrusting member, a retention canceling unit for canceling the state of retention by the thrusting member and a maintenance unit for maintaining a pre-set position of the thrusting member as set by the biasing unit. The retention canceling mechanism has a spring plate arranged within the casing slidably along with the support. The spring plate is moved for canceling the retention by the retention unit upon mounting.

6 Claims, 3 Drawing Sheets

CHAIN TENSIONER

BACKGROUND OF THE INVENTION

1. Technical Field

This invention relates to a retention canceling mechanism for a chain tensioner for canceling the retained state of the chain tensioner at the time of actually mounting the chain tensioner shipped in this state.

2. Related Art

It is known that a chain installed under tension between chain sprockets of a camshaft and a crankshaft, such as an engine timing chain, is subjected to oscillations during rotation if the chain has any slack. For preventing this, a chain tensioner is employed for thrusting the chain for perpetually affording a pre-set tension thereto. Such chain tensioner, described in JP Utility Model Kokoku Publication JP-B-58-38189, includes a housing mounted as a main body portion at a pre-set location, a cylinder bored within the housing, a sleeve slidably fitted within the cylinder, a spring mounted under compression within the sleeve for thrusting one end of the sleeve against the chain, a rotary plate having its one end rotatably mounted on the housing and having its opposite end engaged with a pin protruded towards the sleeve by a hook for retaining the sleeve for prohibiting the sleeve from being protruded under the force of the spring, a tooth shape formed on the outer periphery of the sleeve and a pawl member pivotally mounted by a hinge on the housing. The pawl member is biased by the spring into meshing with the tooth shape for inhibiting only the receding movement of the sleeve. The hook on the sleeve side portion of the rotary plate is formed with a sloped portion gradually raised towards the opposite end. When the sleeve is receded as it is thrust, the sleeve side pin is moved along the sloped portion to rotate the rotary plate for disengaging the rotary plate from the pin thereby canceling its retention. That is, the sleeve has to be transiently receded for canceling the state of retention between the rotary plate and the sleeve pin. The tooth shape is formed with play for canceling the state of retention and the sleeve can be receded axially by a length corresponding to the length of the play.

However, according to the investigation by the present inventors, it has turned out that there is the following problem. Namely, when actually mounting the chain tensioner with the above construction, an excess tension is applied to the chain by a value corresponding to the length of the play for thrusting the sleeve for canceling the state of retention. The result is that the chain is actuated under an excess tension corresponding to the restoration (push-back) of the thrust chain.

SUMMARY OF THE DISCLOSURE

It is therefore an object of the present invention to provide a chain tensioner having a retention canceling mechanism whereby the state of retention of the sleeve is cancelled without push-back of the sleeve provided that the chain tensioner is in the retained state upon shipment.

According to a general aspect of the present invention, a chain tensioner generally comprises a support for mounting a casing at a pre-set position thereof, a thrusting member slidably arranged within the casing for applying tension to a chain, biasing means for supplying a thrusting force to the thrusting member for supplying a pre-set tension to the chain when commanded, retention means for retaining the biasing force of the thrusting member, retention canceling means for canceling the state of retention by the thrusting member, and maintenance means for maintaining a pre-set position of the thrusting member as set by the biasing means. The retention canceling means has a spring plate disposed associated with the casing so as to be slidable relative to the casing, e.g., along with the support. The spring plate is moved for canceling the state of retention (by the retention means) at the time of mounting.

PREFERRED EMBODIMENTS

In the following preferred embodiments will be summarized according to certain aspects.

According to one aspect of the preferred embodiment, the spring plate has a hook provided at one end thereof for engaging the support with the spring plate, and a convex-shaped cam provided at a mid portion thereof for being engaged with a pin for displacing the pin in a direction of disengaging the pin from a lock groove. The spring plate may have further a bent portion provided at an opposite end thereof for guiding and retaining the upper end Of the pin. The spring plate may be supported in the vicinity of the one end thereof by a guide pin for sliding with respect to the casing.

According to a second aspect, there is provided a construction in which the retention means includes a pin protruded axially of a lock pin and lock grooves formed on the outer periphery of a plunger. The pin may be engaged with the spring plate so as to be moved along its own axis.

According to a third aspect, the invention is also directed to a further construction of a chain tensioner. The chain tensioner generally comprises a lever having an abutment surface on its lateral surface and being configured for being slidably abutted against a chain on its opposite lateral surface; a support maintained at a pre-set distance from the lever and having a casing fitted therein; a lock pin fitted radially of the casing so as to be capable of performing a reciprocal movement along its own axis; and a plunger fitted in a cylinder bored in the casing for advancing and receding movement along its own axis with respect to the abutment surface. The plunger has on its outer peripheral surface a first annular groove in which the pin is protruded and engaged for inhibiting movement of the plunger, and a plurality of second annular lock grooves, each of the second annular lock grooves having a wall surface with which the pin protruded into the second annular groove is engaged for inhibiting receding movement of the plunger and a sloped opposite side wall surface with which the pin is in sliding contact when the plunger is advanced to raise the pin.

The chain tensioner also includes a spring plate engaged with an upper end of the pin and capable of being displaced relative to the pin along the axis of he casing. The spring plate has a hook formed at one end thereof for moving the spring plate along with the support, a convexed portion for radially moving the upper end of the pin for disengaging the pin from the lock grooves, and a bent portion formed at an opposite end thereof for clamping the upper end of the pin. The chain tensioner also includes a guide pin for slidably supporting the spring plate with respect to the casing at one end of the spring plate, and oil pressure means for biasing the plunger at a pre-set oil pressure.

When the casing is tightened to the support, the spring plate is moved by the hook in unison with the support. The pin is raised onto the convexed portion for disengaging the pin from the lock grooves. The upper end of the pin is clamped in the bent portion when the casing is completely tightened. The pin is engaged under the bias of the spring plate in one of the plural annular lock grooves as set by a relative position of the casing with the lever about the guide pin as a supporting part (fulcrum point). The plunger is advanced by the oil pressure of the oil pressure means when commanded.

Now the operation of the embodiments will be summarized below.

According to the present invention, the retention canceling means cancels retention by the retention means through movement of the spring plate slid in unison with the support when the casing is mounted on the support, so that the thrusting member gets free to slide in the casing. Thus, when a thrusting force is applied by the biasing means to the thrusting member when commanded, a pre-set tension may be applied to the chain. Also, the position of the thrusting member supplying the pre-set tension can be held by the maintenance means.

According to the first aspect of the preferred embodiment, the hook causes the spring plate to be engaged with the support to be moved. The convex-shaped (bowed) cam causes the pin to be moved in a disengaging direction away from the lock groove so that the pin is further retained by the bent portion.

According to the second aspect, the retention means is capable of inhibiting (or suppressing) the bias of the thrusting member under a state in which an axially protruded pin of the lock pin assembly and the lock groove formed on the outer periphery of the plunger cannot be moved relative to each other.

According to the third aspect, when the casing is tightened to the support, the spring plate is moved by the hook in unison with the support. The pin is raised onto the convexed (bowed) portion for disengaging the pin from the lock grooves. The upper end of the pin is clamped in the bent portion when the casing is completely tightened, whereupon the pin is finally engaged under the bias of the spring plate in one of the plural annular lock grooves as determined by the relative position of the casing to the lever. The plunger is advanced by the oil pressure supplied by the oil pressure means only when commanded, e.g., engine is started.

Meritorious effect of the invention will be summarized as follows.

DETAILED DESCRIPTION OF THE PREFERRED EMBODIMENTS

Figure 1:
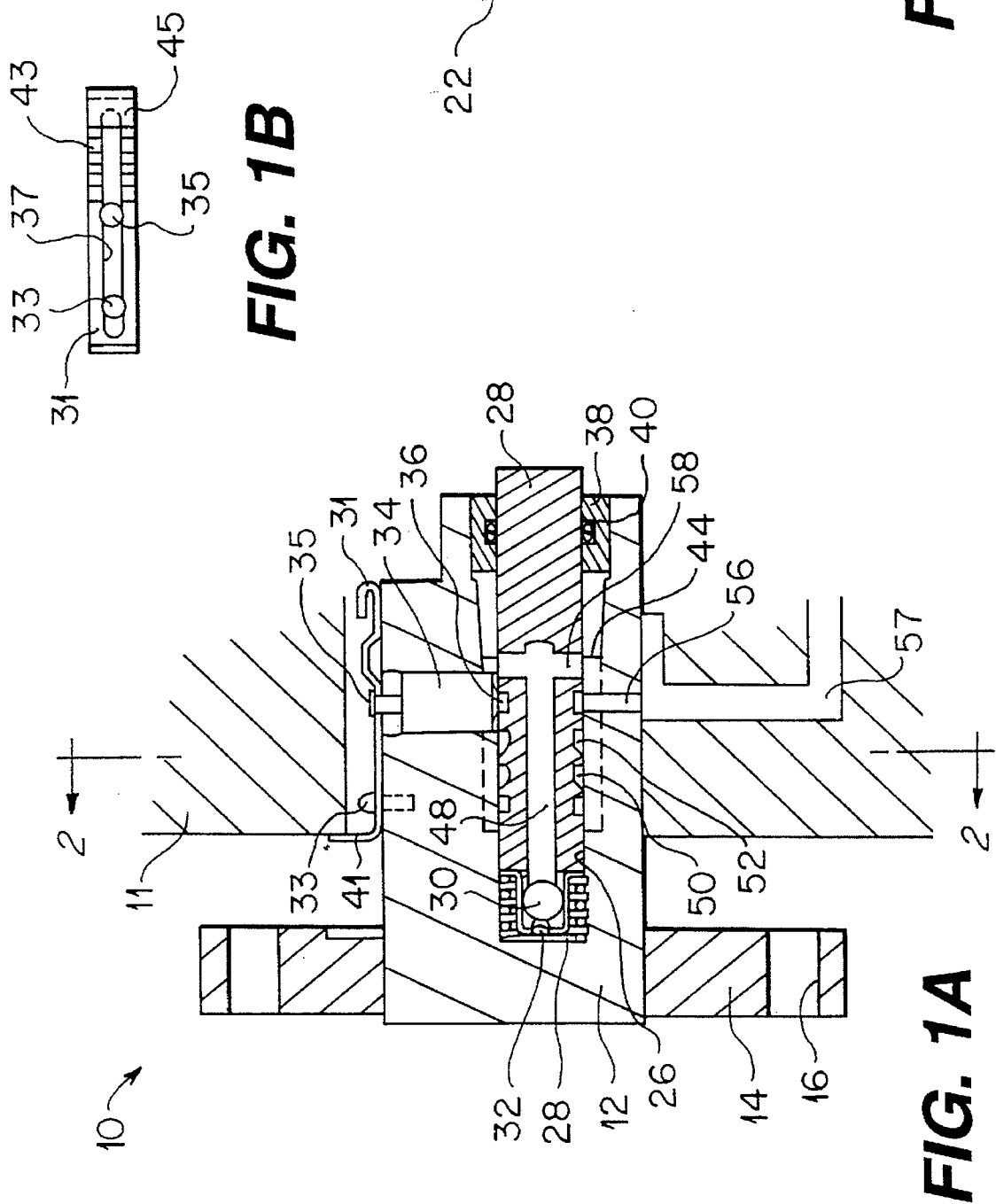
FIG. 1 shows a chain tensioner having a retention canceling mechanism according to the present invention, a lever against which the chain tensioner is thrust during mounting and a spring plate in a cross-sectional view, side view and top plan view, respectively.

Referring to the drawings, a preferred embodiment of the present invention will be explained in detail.

FIG. 1 shows a chain tensioner 10 having a retention canceling mechanism according to the present invention in a cross-sectional view. FIG. 1 also shows a spring plate 31 disposed between a casing 12 and a support 11 in a top plan view, while showing a lever 20 against which the chain tensioner 10 is thrust at the time of mounting in a side elevational view. A chain or a belt, not shown, is caused to bear against the right-hand side surface of the lever 20. The shape of the lever 20 is shown merely conceptually in FIG. 1. The illustrative shape of the lever 20 and the disposition of the chain abutted against the lever are shown in FIG. 3. The chain tensioner 10, shown in FIG. 1, is shown in FIG. 2 by a cross-section taken along line A—A in FIG. 1.

Figure 2:
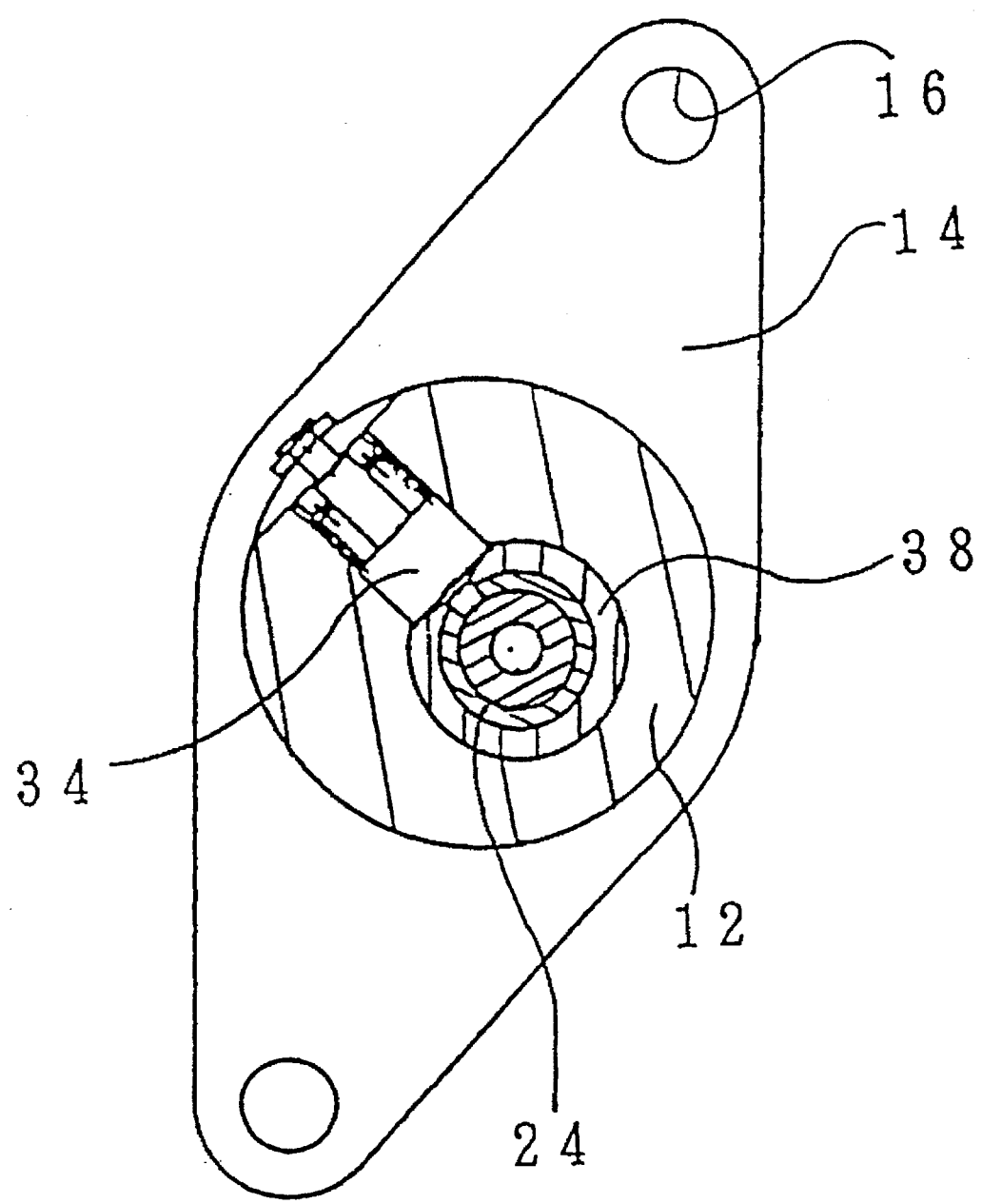
FIG. 2 is a cross-sectional view of the chain tensioner of FIG. 1, taken along line A—A of FIG. 1.
Figure 3:
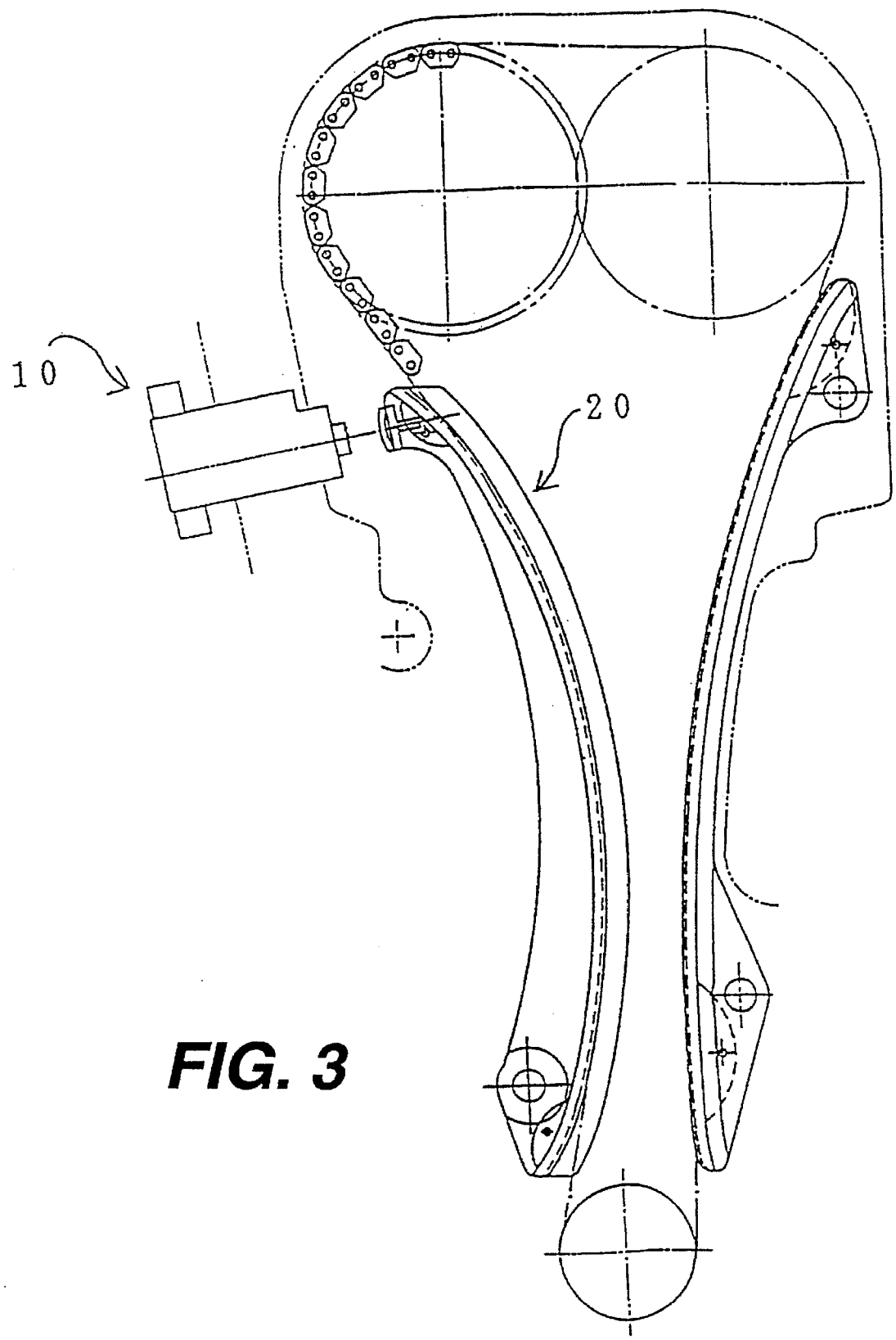
FIG. 3 shows an illustrative shape of the lever shown in FIG. 1 and an arrangement of a chain abutted against the lever.

Referring to FIGS. 1 and 2, there is provided on a cylindrical-shaped casing 12 of a chain tensioner 10 a flange 14 having a tightening hole 16 for tightening the chain tensioner to a support (base stationary member) 11 furnishing a pre-set mounting position. Within the casing 12, there is formed a cylinder 26 within which are arranged a check ball 30, a retainer 32 slidable axially of the cylinder 26 and adapted for holding the check ball 30, and an axially slidable plunger 24 also rotatable about its own axis. Between the retainer 32 and the left-hand end extremity of the cylinder in the drawing, there is disposed a spring 28 biasing the plunger 24 under a weaker spring force in, a direction of advancing the plunger 24 (towards right in the drawing) by means of the retainer 32 and the check ball 30.

A lock pin 34 is securely fitted to the cylinder 26 for extending at right angles to the axis of the cylinder 26. The lock pin 34 has a pin 36 capable of being moved vertically along the axis of the lock pin 34.

On the right-hand end extremity of the casing 12 is fitted a guide 38 supporting the plunger 24 for sliding movement. On the inner side of the guide 38 is arranged a seal 40. The cylinder 26 has an enlarged inside diameter at a shoulder 44.

The plunger 24 has an axially extending cylindrical-shaped cavity 48, on the left-hand extreme peripheral end portion of which is seated a spherical surface of the check ball 30. The outer peripheral surface of the plunger 24 is formed with plural annular lock grooves 50. The right-hand inner wall surface of each lock groove 50 is substantially upright (at right angles to the axis) oriented, whereas its left-hand inner wall surface is sloped at 52 so that the lock groove 50 is increased in width as the sliding surface between the plunger 24 and the cylinder 26 is approached. However, the left-most lock groove 50 and the right-most lock groove 50 in FIG. 1 are not formed with the sloped wall surface 52, that is both lateral wall surfaces of the grooves are extended upright.

The pressure oil from a pressure oil supply duct 57 in the support 11 is supplied to the cavity 48 via a pressure oil supply port 56 in the casing 12, an axially extending groove indicated by a broken line in FIG. 1 or a play for the plunger 24, and an oil conduit 58.

Between the casing 12 and the support 11 is a gap within which is arranged a spring plate 31 extending and slidable axially of the cylinder 26. The spring plate 31 has a guide groove 37 extending axially of the cylinder 26. Within the guide groove 37, a guide pin 33 radially fitted to the casing 12 and an upper end 35 of the pin 36 which is the opposite end of the lock pin 34 are arranged for sliding along the guide groove 37. The guide pin 33 has its upper end enlarged so as to be larger in diameter than the width of the guide groove 37 for prohibiting the spring plate 31 for being disengaged from the casing 12. The left end extremity of the spring plate 31 is bent substantially upright (at right angles) and formed as a hook 41 adapted to be engaged with the support 11, while the mid portion of the spring plate 31 is formed with a convexed (bowed) portion 43 adapted for raising the pin 36 until the pin is disengaged from the lock groove 50. The right-hand end extremity of the spring plate 31 is formed with a bent portion 45 adapted for retaining the upper end 35 of the pin 36 intruded therein.

The lever 20 has an abutment surface 22 which is, e.g., circular in cross-section and on which is abutted the right-hand end face of the plunger 24.

The operation of the chain tensioner 10 of the present embodiment will be now explained.

The chain tensioner 10 is shipped in a retained state shown in FIG. 1. That is, the spring 28 biases the plunger 24 in the advancing direction via the retainer 32 and the check ball 30, while the hook 41 is engaged with the support 41. The upper end 35 of the pin 36 is positioned directly ahead of the convexed portion 43.

For actually mounting the chain tensioner 10, a tightening fixture, such as a bolt, is screwed into the tightening hole 16 for tightening the chain tensioner to the support 11. As the bolt is tightened, the gap between the chain tensioner 10 and the support 11 is reduced, such that the hook 41, that is the spring plate 31, starts to be moved towards left with respect to the casing 12. The upper end 35 of the pin 36 then rides on the convexed portion 43 to permit upward movement of the pin 36 to permit the sliding of the plunger 24 within the cylinder 26. Thus the right-hand end face of the plunger 24 is moved towards the right under the bias of the spring 28 until it is abutted against the abutment surface 22 of the lever 20. Since the spring force of the spring 28 is set so as not to cause movement of the lever 20, the plunger 24 is slightly pushed back as the gap between the chain tensioner 10 and the support 11 is reduced. The upper end 35 of the pin 36 is moved away from the convexed portion 43 in the interim. As the bolt is further tightened and the flange 14 is completely tightened to the support 11, the upper end 35 of the pin 36 is intruded into a gap of the bent portion 45 having a guide for the spring plate 31 so that the pin 36 is pushed down under the bias of the spring 31. The gap between the flange 14 and the support 11 and the gap between the plunger 24 and the abutment surface 22 of the lever 20 are previously so set that, at a time point of completion of the mounting operation, the pin 36 is engaged at a pre-set one of the lock grooves 50 as counted from the right-hand end.

The retention state is canceled at this time point. Since the spring force of the spring 28 is set to a weaker magnitude, it is not possible for the plunger 24 to raise the pin 36 of the lock pin unit 34 to permit the pin 36 to ride over the slope 52 to be moved to the adjacent lock groove 50. As from this time, the guide pin 33 operates as a fulcrum point for the spring plate 31 which then operates as a spring for downwardly biasing the upper end 35 of the pin 36 intruded into and clamped by the bent portion 45.

If, in this retention canceled state, the engine is started, a pre-set oil pressure is supplied via the pressure oil supply duct 57, oil supply port 56, axial groove and oil conduit 58 into the cavity 48. This displaces the check ball 48 to be moved away from the end of the cavity 48 to raise the oil pressure in the left-hand portion of the cylinder 26. The pin 36 is then slid along the slope 52 as it raises the convexed portion 45 against the bias of the spring plate 31. The plunger 24 is advanced rapidly to thrust the lever 20 against the chain. The plunger 24 is halted at a position of equilibrium between the oil pressure and the chain tension, the pin 36 remaining then engaged in the lock groove 50 at the equilibrium position.

If the chain is slacked by some reason, it is possible for the plunger 24 to be advanced to a new position of equilibrium between the oil pressure and the chain tension.

If the engine is halted and the oil pressure becomes depleted, the oil pressure in the cavity 48 is lowered. However, since the check ball 30 is drawn toward the cavity 48, the oil pressure is decreased only gradually. The result is that the pin 36 is engaged with the right-hand side inner wall surface of the lock groove 50 only moderately to prevent respective members from being worn out or deformed. Since the position of equilibrium between the oil pressure and the chain tension is maintained by the pin 36, proper chain tension may be produced on starting the engine next time.

Thus the state of retention of the chain tensioner 10 is canceled by the operation of the spring plate 31, such that the operation of strongly thrusting the chain tensioner against the lever 20 is not required. On the other hand, when the state of retention is canceled, the chain tensioner 10 is locked by the pin 36. That is, the plunger 24 is advanced for tensioning the chain to a pre-set value only when the oil pressure is supplied, so that there is no risk of applying excess tension to the chain.

According to the present invention, described above, the state of retention is canceled at the time of mounting, and the oil pressure can be generated for tensioning the chain to pre-set value, e.g., only when the engine is started. The result is that, as contrasted to the conventional system in which the state of retention is canceled by applying excess tension to the chain by a length corresponding to the play for thrusting the plunger, there is no risk that the chain be actuated under an excess tension caused by the push-back of the chain. Therefore, there is no more risk of over-tension for canceling (releasing) the retained state of chain tensioner upon mounting.

It should be understood that modification from the disclosed embodiment may be made without departing from the gist and scope of the present invention disclosed herein and claimed by the appended claims.

What is claimed is:

1. A chain tensioner comprising:

a support for mounting a casing at a pre-set position thereof;

a thrusting member slidably arranged within said casing for applying tension to a chain;

biasing means for supplying a thrusting force to said thrusting member for supplying a pre-set tension to said chain when commanded;

retention means for retaining the biasing force of said thrusting member;

retention canceling means for canceling the state of retention by said thrusting member; and maintenance means for maintaining a pre-set position of said thrusting member as set by said biasing means;

wherein said retention canceling means comprises a spring plate disposed associated with said casing so as to be slidable relative to the casing, said spring plate being moved for canceling the state of retention upon mounting.

2. The chain tensioner as defined in claim 1 wherein said spring plate has a hook provided at one end thereof for engaging said support with said spring plate, and a convex-shaped cam provided at a mid portion thereof for being engaged with a pin for displacing said pin in a direction of disengaging said pin from a lock groove, said spring plate being supported in the vicinity of said one end thereof by a guide pin for sliding with respect to said casing.

3. The chain tensioner as defined in claim 2, wherein said spring plate further comprises a bent portion provided at an opposite end of the hook, for guiding and retaining the upper end of said pin.

4. The chain tensioner as defined in claim 2 wherein said retention means includes said pin, said pin being protruded axially of a lock pin, and lock grooves formed on the outer periphery of a plunger, said pin being engaged with said spring plate so as to be moved along an axis of said pin.

5. The chain tensioner as defined in claim 1, wherein said hook is adapted to move along with said support upon mounting the chain tensioner.

6. A chain tensioner comprising:

a lever having an abutment surface on its lateral surface and being adapted for slidably being abutted against a chain on its opposite lateral surface;

a support maintained at a pre-set distance from said lever and having a casing fitted therein;

a lock pin fitted radially of said casing so as to be capable of performing a reciprocal movement along its own axis;

a plunger fitted in a cylinder bored in said casing for advancing and receding movement along its own axis with respect to said abutment surface, said plunger having, on its outer peripheral surface, a first annular groove in which said pin is protruded and engaged for inhibiting movement of said plunger, and a plurality of second annular lock grooves, each of the second annular lock grooves having a wall surface with which said pin protruded into said second annular groove is engaged for inhibiting receding movement of said plunger and a sloped opposite side wall surface with which said pin is in sliding contact when said plunger is advanced to raise said pin;

a spring plate engaged with an upper end of said pin and capable of being displaced relative to said pin along the axis of said casing, said spring plate having a hook formed at one end thereof for moving the spring plate along with said support, a convexed portion for radially moving the upper end of the pin for disengaging said pin from said lock grooves, and a bent portion formed at an opposite end thereof for clamping the upper end of said pin;

a guide pin for slidably supporting said spring plate with respect to said casing at one end of said spring plate;

and oil pressure means for biasing said plunger at a pre-set oil pressure;

wherein, when said casing is tightened to said support, said spring plate is moved by said hook in unison with said support, said pin being raised onto said convexed portion for disengaging said pin from said lock grooves, the upper end of said pin being clamped in said bent portion when the casing is completely tightened, said pin is engaged under the bias of said spring plate in one of the plural annular lock grooves as set by a relative position of the casing with said lever, about said guide pin as a supporting part, said plunger being advanced by the oil pressure of the oil pressure means when commanded.

* * * * *